United States Patent [19]
Talwar et al.

[11] Patent Number: 5,548,838
[45] Date of Patent: Aug. 20, 1996

[54] INTERFERENCE CANCELLATION SYSTEM EMPLOYING A POLAR VECTOR MODULATOR

[75] Inventors: Ashok K. Talwar, Westlake Village; Roy C. Monzello, Agoura Hills, both of Calif.

[73] Assignee: American Nucleonics Corporation, Westlake Village, Calif.

[21] Appl. No.: 271,511

[22] Filed: Jul. 7, 1994

[51] Int. Cl.$^6$ .................................................. H04B 1/00
[52] U.S. Cl. ...................... 455/304; 455/272; 455/276.1; 455/278.1; 455/296
[58] Field of Search ...................................... 455/272, 273, 455/276.1, 278.1, 279.1, 280, 283, 303, 304, 78, 83, 284, 289, 296, 24

[56] References Cited

U.S. PATENT DOCUMENTS

| | | | |
|---|---|---|---|
| 3,699,444 | 10/1972 | Ghose et al. | 325/21 |
| 4,075,566 | 2/1978 | D'Arcangelis | 325/269 |
| 5,117,505 | 5/1992 | Talwar | 455/278.1 |
| 5,125,108 | 6/1992 | Talwar | 455/278.1 |
| 5,152,010 | 9/1992 | Talwar | 455/136 |
| 5,428,831 | 6/1995 | Monzello et al. | 455/296 |

OTHER PUBLICATIONS

Rabindra N. Ghose, "Collocation of Receivers and High-Power Broadcast Transmitters", *IEEE Transactions on Broadcasting*, vol. 34, No. 2: 154–158 (Jun. 1988).

*Primary Examiner*—Reinhard J. Eisenzopf
*Assistant Examiner*—Lee Nguyen
*Attorney, Agent, or Firm*—Hoffmann & Baron

[57] ABSTRACT

An interference cancellation system employing a polar vector modulator obtains a reference signal and a received signal. The received signal has a desired signal component and an interfering signal component. The reference and received signals as well as an auxiliary signal of known frequency and amplitude, are provided to a signal correlator circuit which compares and correlates the reference and received signals and generates an adjusted auxiliary signal which corresponds to the auxiliary signal adjusted in phase and amplitude. A phase detector detects the difference in phase between the auxiliary signal and the adjusted auxiliary signal and generates a phase control signal in response. Likewise, an amplitude detector measures the amplitude of the adjusted auxiliary signal and generates an amplitude control signal in response. The phase and amplitude control signals and the reference signal are provided to a polar vector modulator having a 360° variable phase shifter and a variable attenuator coupled together in series, each of which has a low or negligible insertion loss. The reference signal is amplitude and phase adjusted by the polar vector modulator to have substantially the same amplitude and to be 180° out of phase with the interfering signal component of the received signal. The amplitude and phase adjusted reference signal is then summed with the received signal so that substantially only the desired signal component of the received signal remains.

7 Claims, 4 Drawing Sheets

2

INTERFERENCE CANCELLATION SYSTEM EMPLOYING A POLAR VECTOR MODULATOR

BACKGROUND OF THE INVENTION

1. Field of the Invention

The present invention generally relates to interference cancellation systems, and more particularly to interference cancellation systems with increased sensitivity and techniques for reducing the amount of losses in an interference cancellation system.

2. Description of the Prior Art

FIG. 1 is a functional diagram of a traditional interference cancellation system 1 having a reference input port 2 for providing a sample of an interfering signal, and a receiver antenna 4 for providing a receive signal on receiver transmission line 6 which couples the receiver antenna to a receiver 7. In order to obtain a sample of the interfering signal, reference input port 2 may be coupled to an auxiliary antenna (not shown), for example, if the receiver and source of the interfering signal are not collocated. Alternatively, the reference input port 2 may be directly coupled to the interfering signal source if the source and receiver are collocated. The receive signal includes a desired signal component plus an interfering signal component.

The traditional interference cancellation system further includes a directional coupler 8 operatively connected to the reference input port 2 in order to provide an interfering signal sample on line 10 to a synchronous detector 12. The interfering signal sample is also provided via line 13 to a signal controller 14 which is operatively connected to the reference input port 2. The traditional interference cancellation system also includes a directional coupler 16 which is operatively connected to the receiver transmission line 6, for providing a sample of the receive signal to the synchronous detector 12 via line 18.

The synchronous detector 12 receives both the interfering signal sample via line 10 and a sample of the receive signal via line 18. Thereafter, the synchronous detector compares the interfering signal sample with the receive signal sample and essentially detects the portion of the receive signal sample (i.e., the interfering signal component) that is coherent with the interfering signal sample. The synchronous detector 12 then provides DC output signals on its output ports which correspond to differences in amplitude and phase between the interfering signal sample and the coherent signal component of the receive signal.

The traditional interference cancellation system also includes amplifiers and/or integrators 20 which are connected to the outputs of the synchronous detector 12 so that the DC output signals will be amplified and/or integrated to effectively create DC control signals, which are provided via lines 21, 22 to the signal controller 14.

The signal controller 14, also commonly known as a vector modulator, is regulated by the DC control signals provided by the synchronous detector 12 and integrator/amplifiers 20 of closed loops. As previously described, a first input of the signal controller is provided with an interfering signal sample from the reference input port 2 via line 13. Additionally, two other inputs of the signal controller receive the control signals from the integrator/amplifiers 20 via lines 21, 22. The output port of the signal controller is operatively coupled to a directional coupler 23. A cancellation signal generated by the signal controller is provided on the signal controller output port to the directional coupler 23.

Receiver transmission line 6 is operatively coupled to directional coupler 23 such that the cancellation signal is injected into the receiver transmission line carrying the receive signal. Specifically, the cancellation signal, when injected into receiver transmission line 6, effectively cancels the interfering signal component from the receive signal.

In the conventional interference cancellation system of FIG. 1, the signal controller (or vector modulator) and synchronous detector are typically quadrature devices. Quadrature vector modulators are commonly used in interference cancellation systems to adjust the amplitude and phase of a reference signal (such as on reference port 2) which is then injected as a cancellation signal into the receiver system to eliminate or minimize the effect of an interfering signal component in a received signal.

Typically, quadrature modulators have an insertion loss of at least 6 dB. As shown in FIG. 1A, a typical quadrature vector modulator 14 (i.e., signal controller) includes a quadrature hybrid splitter 25 which splits a reference signal into two components (i.e., a 0° phase and a 90° phase intermediary signal). Each intermediary signal is provided to a respective biphase variable attenuator 26 whose attenuation is controlled by the control signals provided at control port 27. The intermediary signals, attenuated by the variable attenuators, are then recombined in an in-phase combiner 28, which provides the cancellation signal on its outport 29. Typically, each of the quadrature hybrid splitter and in-phase combiner has a 3 dB insertion loss which together contribute 6 dB to the insertion loss of the signal controller. When losses due to circuit imperfections such as resistive losses are included, the total insertion loss of the conventional signal controller is in the range of 8 to 10 dB.

Oftentimes, the reference signal does not possess sufficient power to overcome the high insertion loss of the signal controller. If an amplifier is used to compensate for the loss, the amplifier may inject an unacceptable amount of thermal noise into the receiver transmission line, and may distort the reference signal, which leads to poor interfering signal cancellation performance. Therefore, it is desirable to reduce the insertion losses in the reference path (i.e., between the reference input port and the receiver transmission line).

OBJECTS AND SUMMARY OF THE INVENTION

It is an object of the present invention to provide apparatus and a method for reducing the amount of signal noise and signal distortion in an output signal of a vector modulator.

It is another object of the present invention to provide a vector modulator having minimal insertion loss in the reference path.

It is yet another object of the present invention to provide an interference cancellation system and method which provides enhanced cancellation performance.

It is a further object of the present invention to provide an interference cancellation system which has greater sensitivity and lower noise and signal distortion than conventional interference cancellation systems.

It is yet a further object of the present invention to provide an interference cancellation system having a reference signal path exhibiting a low insertion loss.

It is still another object of the present invention to provide an interference cancellation system and method which employs quadrature detector information, but the cancellation system provides polar control.

It is still another object of the present invention to provide an interference cancellation system and method which overcome the inherent disadvantages of known interference cancellation systems and methods.

In accordance with one form of the present invention, an interference cancellation system formed in accordance with the present invention employs a "polar" vector modulator (which is also the subject of the present invention) instead of a conventional vector modulator, to reduce the insertion loss in the reference signal path of the cancellation system, as will be explained in greater detail.

The interference cancellation system includes a first directional coupler, a synchronous detector, signal controller, signal generator and the polar vector modulator of the present invention. The first directional coupler provides a reference signal, which is essentially a sample of an interfering signal received from an auxiliary antenna or from a transmitter collocated with a receiver to which the interference cancellation system is connected, to respective inputs of the synchronous phase detector and the polar vector modulator.

A second directional coupler is operatively coupled to a receiver transmission line coupling a receiver with its receiver antenna, the second coupler providing a sample of a received signal to a second input port of the synchronous detector. The signal generator is operatively coupled to an input port of the signal controller. The synchronous detector essentially detects the signal components of the received signal sample that are coherent with the reference (interfering) signal sample. Thereafter, the synchronous detector provides amplitude and phase control signals corresponding to the difference in phase and amplitude between the reference (interfering) signal sample and the received signal sample to the signal controller. The signal controller then effectively alters the phase and amplitude of the auxiliary signal based upon the control signals and provides an amplitude and phase adjusted auxiliary signal as a signal controller output signal.

The interference cancellation system of the present invention also preferably includes a phase detector having a first input port coupled to an output port of the signal generator and a second input port coupled to the signal controller output port. The phase detector essentially detects the difference in phase between the auxiliary signal and the signal controller output signal, and generates a phase control signal. The interference cancellation system also includes an amplitude detector coupled to the signal controller output port so as to generate an amplitude control signal on the amplitude detector output port. The amplitude and phase control signals are provided to the polar vector modulator.

The polar vector modulator of the present invention has a first input port coupled to the reference input port, a second input port coupled to the phase detector output port, a third input port coupled to the output port of the amplitude detector and an output port coupled to a third directional coupler for injecting a polar vector modulator output signal (i.e., a cancellation signal) onto the receiver transmission line. The polar vector modulator receives the reference signal sample and provides a phase and amplitude adjusted reference signal (i.e., cancellation signal) as an output signal. The phase and amplitude adjusted reference signal has substantially the same amplitude as the interfering signal component of the receive signal, but it is substantially 180° out of phase with the interfering signal component of the receive signal. This phase and amplitude adjusted reference signal is injected onto the receiver transmission line by the third directional coupler so that it cancels or minimizes the interfering signal component of the receive signal. As a result, what is left on the receiver transmission line is essentially the desired signal component.

The "polar" vector modulator of the present invention includes a variable phase shifter and a variable attenuator coupled together in series. The phase shifter has a 360 degree range. It receives the phase control signal from the phase detector and adjusts the phase of the reference signal accordingly. Similarly, the attenuator has sufficient range to cover the variations in the amount of interference received. It receives the amplitude control signal from the amplitude detector and adjusts the amplitude of the reference signal accordingly, and so generates the cancellation signal used to cancel the interfering signal component of the receive signal.

Because the polar vector modulator of the present invention includes only a phase shifter and an attenuator coupled in series, each of which has only a 0.5 dB or less insertion loss, the losses in the reference signal path of the interference cancellation system are minimal and far below those losses associated with conventional vector modulators of known interference cancellation systems.

A preferred form of the interference cancellation system employing a polar vector modulator as well as other embodiments, objects, features and advantages of this invention will be apparent from the following detailed description of illustrative embodiments thereof, which is to be read in connection with the accompanying drawings.

DETAILED DESCRIPTION OF THE PREFERRED EMBODIMENTS

Figure 2:
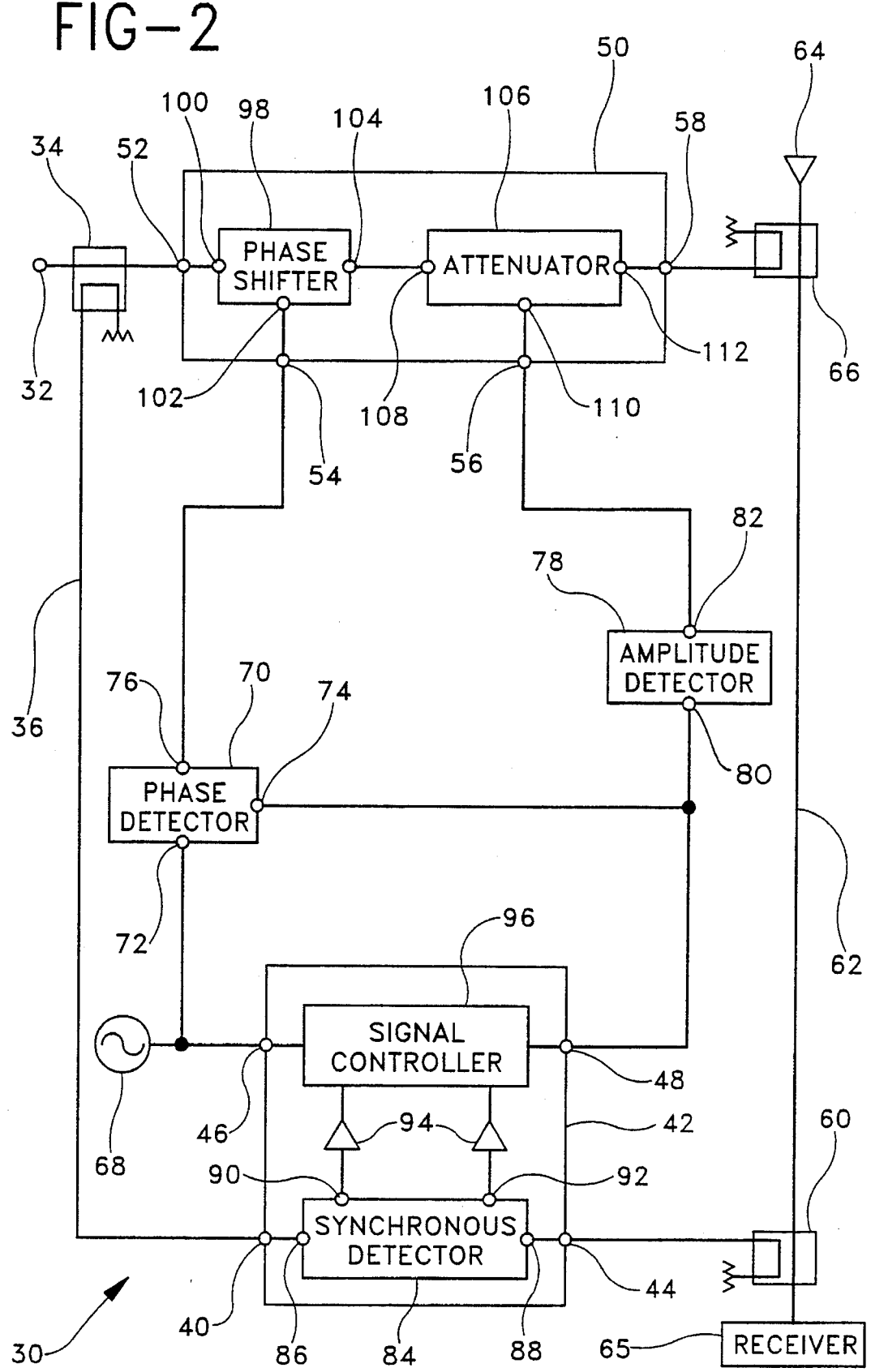
FIG. 2 is a functional block diagram of one form of an interference canceler employing a polar vector modulator for reduction of the amount of an interfering signal in a received signal in accordance with the present invention.

Referring now to the drawings, FIG. 2 illustrates one form of an interference cancellation system employing a "polar" vector modulator formed in accordance with the present invention. The interference cancellation system of the present invention is designed to utilize the "polar" vector modulator in order to reduce and minimize insertion losses in the reference signal path of the cancellation system when removing an unwanted interfering signal component from a received signal on a receiver transmission line. In fact, the losses in the reference signal path are far below those losses associated with conventional vector modulators of known interference cancellation systems.

The interference cancellation system 30 includes a reference input port 32 on which is provided a reference signal having an amplitude component and a phase component which is substantially a sample of an interfering signal which results in the unwanted interfering signal component of the received signal. Reference input port 32 may be coupled to an auxiliary antenna (not shown) if the source of the interfering signal is remotely located from the receiver. Alternatively, the reference input port may be directly coupled to the source of the interfering signal if the source and receiver are collocated. A first directional coupler 34, also known as a reference coupler, having an input port, a terminated port and first and second output ports, is electrically coupled at its input port to the reference input port 32 to receive the reference signal and provide a sample of the reference signal on its first output port. Electrically coupled to the first output port through line 36 is a first input port 40 of a signal correlator circuit 42. The signal correlator circuit also includes second and third input ports 44, 46 and output port 48. Connected to the second output port of the reference coupler 34 to receive the reference signal is a polar vector modulator 50 having first, second and third input ports 52, 54, 56 and output port 58. The first input port 52 of the polar vector modulator 50 receives the reference signal through reference coupler 34.

The interference cancellation system 30 further includes a second directional coupler 60, which is also known as an error coupler, having an input port, a terminated port, and first and second output ports. The input port of the second directional coupler 60 is electrically coupled to receiver transmission line 62. The receiver transmission line 62 has an antenna receiver 64 coupled thereto for providing on the receiver transmission line, the received signal which includes the desired signal and the unwanted interfering signal component. The first output port of the second directional coupler is electrically coupled to the second input port 44 of the signal correlator circuit 42 and provides an error signal to circuit 42 which corresponds to the received signal. The second output port of coupler 60 is correlated to the receiver 65.

The interference cancellation system 30 also includes a third directional coupler 66, which is also known as a summing coupler, having first and second input ports, a terminated port and an output port. The first input port of the third directional coupler 66 is electrically coupled to the output port 58 of the polar vector modulator 50. The third directional coupler 66 is situated in-line with receiver transmission line 62 with its second input port electrically coupled to receiver antenna 64 and its output port being electrically coupled through transmission line 62 to the input port of the error coupler 60.

Electrically coupled to the third input port 46 of the signal correlator circuit 42 is an auxiliary signal generator 68 for providing an auxiliary signal of a fixed frequency and amplitude to the signal correlator circuit 42. A suitable signal generator for use in the present invention is Part No. 8656B manufactured by Hewlett Packard. This signal generator is a highly accurate source. However, the present invention does not require an accurate or highly stable source for the auxiliary signal generator 68. The interference cancellation system also includes a phase detector 70 having first and second input ports 72, 74 and output port 76. The first input port 72 of the phase detector 70 is preferably coupled to the output port of the auxiliary signal generator 68. In addition, the phase detector second input port 74 is coupled to the signal correlator circuit output port 48. The phase detector effectively determines a phase difference between the auxiliary signal and the signal correlator circuit output signal. Based on the phase difference between these signals, the phase detector 70 provides a first polar vector modulator control signal, which may be a voltage which varies in amplitude in response to the phase difference. A suitable phase detector for use in the present invention is Part No. MC4044 manufactured by Motorola.

Also electrically coupled to the signal correlator circuit output port 48 is an amplitude detector 78 having an input port 80 and an output port 82. The output port of the amplitude detector is electrically coupled to the third input port 56 of the polar vector modulator 50. The amplitude detector 78 senses the amplitude of the signal correlator circuit output signal. Based upon the signal detected by the amplitude detector, and knowing the amplitude of the signal generated by signal generator 68, a second polar vector modulator control signal is provided to the polar vector modulator.

The signal correlator circuit 42 which is coupled to the auxiliary signal generator 68 and which is utilized in the present invention preferably includes a synchronous detector 84 which has at least first and second input ports 86, 88 which respectively correspond to the first and second input ports 40, 44 of the signal correlator circuit 42. The synchronous detector also preferably includes output ports 90, 92. The first input port 86 of the synchronous detector 84 is electrically coupled to the first output port of the reference coupler 34 while the second input port 88 is electrically coupled to the first output port of the error coupler 60. As a result, the reference signal provided to the reference input port 32 and the received signal provided by receiver antenna 64 are provided to the synchronous detector 84.

The synchronous detector is basically a quadrature phase detector. A typical synchronous detector which is suitable for use is described in Rabindra Ghose and Walter Sauter U.S. Pat. No. 3,699,444, the disclosure of which is incorporated herein by reference. The synchronous detector compares the reference signal sample and the received signal sample and provides one or more synchronous detector DC output signals on corresponding synchronous detector output ports.

The signal correlator circuit 42 may also include amplifiers and/or integrators 94 which are preferably connected to the output ports 90,92 of the synchronous detector 84 so that the DC output signals of the synchronous detector will be amplified and/or integrated to create suitable control signals which are independent of other signals, such as the signal of interest, present in the receive line because they are uncorrelated with the reference signal sample. These control signals are provided to a signal controller 96 of the signal correlator circuit 42.

A signal controller 96, also known as a vector modulator, which is suitable for use in the interference cancellation system of the present invention is described in U.S. Pat. No. 3,699,444, mentioned previously. In its simplest form, the signal controller may consist of the structure shown in FIG. 1A, that is, a hybrid splitter 25, a biphase variable attenuator 26, and an in-phase combiner 28. In the present invention, one input of the signal controller 96 is provided with an auxiliary signal from the signal generator 68. Two other inputs of the signal controller preferably receive the control signals from the amplifiers/integrators 94. An output signal of the signal controller is provided as the output signal of the signal correlator circuit 42. The output signal of the signal controller corresponds to the auxiliary signal provided by the signal generator 68, manipulated in accordance with the control signals provided by the synchronous detector 84. The control signals correspond to, and are generated in accordance with, the reference signal sample and received signal provided to the synchronous detector 84.

The signal correlator circuit 42 functions in many ways like the system described in the publication "Antenna Spacing Consideration In An Interference Canceler" by Ashok K.

Talwar, published in IEEE Transactions on Broadcasting, Vol. 36, No. 3, pp. 203–06, September 1990, the disclosure of which is incorporated herein by reference. Rather than receiving the reference signal, as described in the above publication, the signal controller 96 of the signal correlator circuit 42 receives the signal of known amplitude and frequency from the signal generator 68, and changes the phase and amplitude of the known signal in accordance with the correlation performed by the synchronous detector 84 between the reference signal and the received signal.

Figure 1:
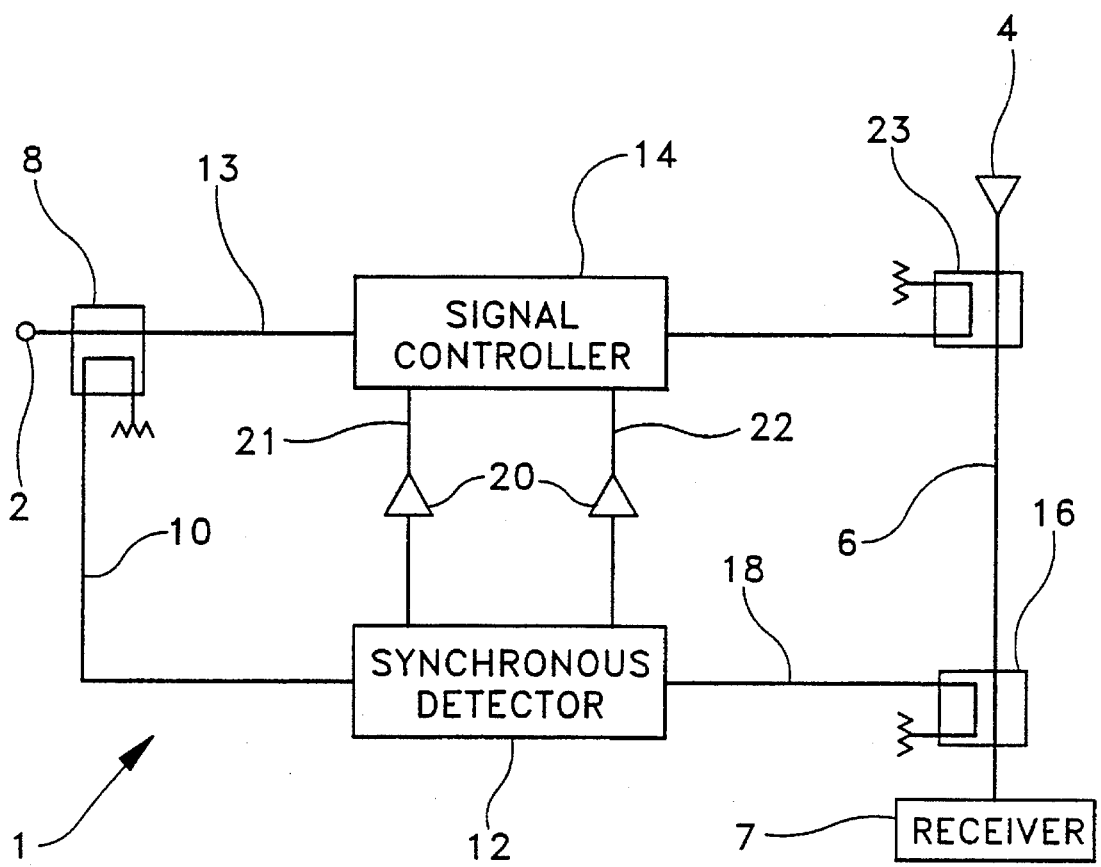
FIG. 1 is a functional block diagram of a conventional interference canceler.
Figure 1A:
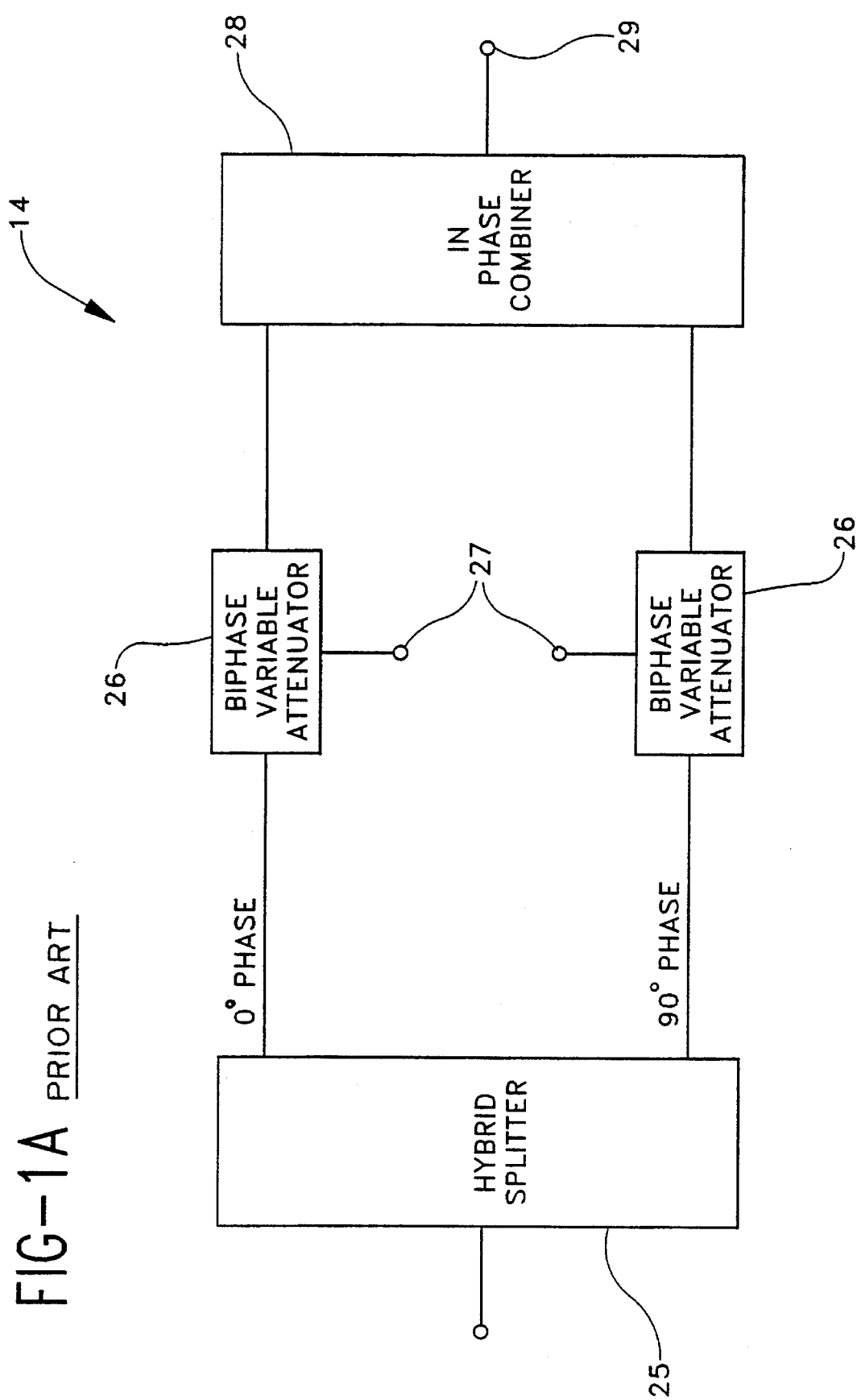
FIG. 1A is a functional block diagram of a quadrature vector modulator utilized in conventional interference cancelers.

The polar vector modulator 50 of the present invention is vectorally "polar" in function because it does not divide the reference signal into an in-phase and quadrature phase component and adjust the amplitudes of the components as with conventional vector modulators such as shown in FIG. 1A, but rather provides 360° phase adjustment and sufficient amplitude adjustment directly to the reference signal. Thus, the polar vector modulator avoids the need for a splitter and a combiner, and their associated 3 dB insertion losses, found in conventional vector modulators. The polar vector modulator 50 preferably includes a variable phase shifter 98 having a signal input port 100, a control signal port 102 and a signal output port 104. The polar vector modulator also preferably includes an attenuator 106 having a signal input port 108, a control signal port 110 and a signal output port 112. The phase shifter is serially coupled to the attenuator. In a preferred embodiment, the variable phase shifter output port 104 is electrically coupled to the attenuator input port 108. Additionally, the phase shifter signal input port 100 corresponds to the polar vector modulator first input port 52 while the phase shifter control signal port 102 corresponds to the polar vector modulator second input port 54. Moreover, the attenuator control signal input port 110 corresponds to the polar vector modulator third input port 56 while the attenuator output port 112 corresponds to the polar vector modulator output port 58. However, it should be noted that the phase detector and attenuator could be changed in relative positions within the polar vector modulator as long as the phase detector and amplitude detector are appropriately coupled thereto and serially coupled. The variable phase shifter preferably has a 360 degree range to cover variations in the amount of interference received. A suitable phase shifter for use in the present invention is Part No. 9520-28 manufactured by Tele Tech while a suitable attenuator is Part No. P35-4300-1 manufactured by GEC-Marconi.

Figure 3:
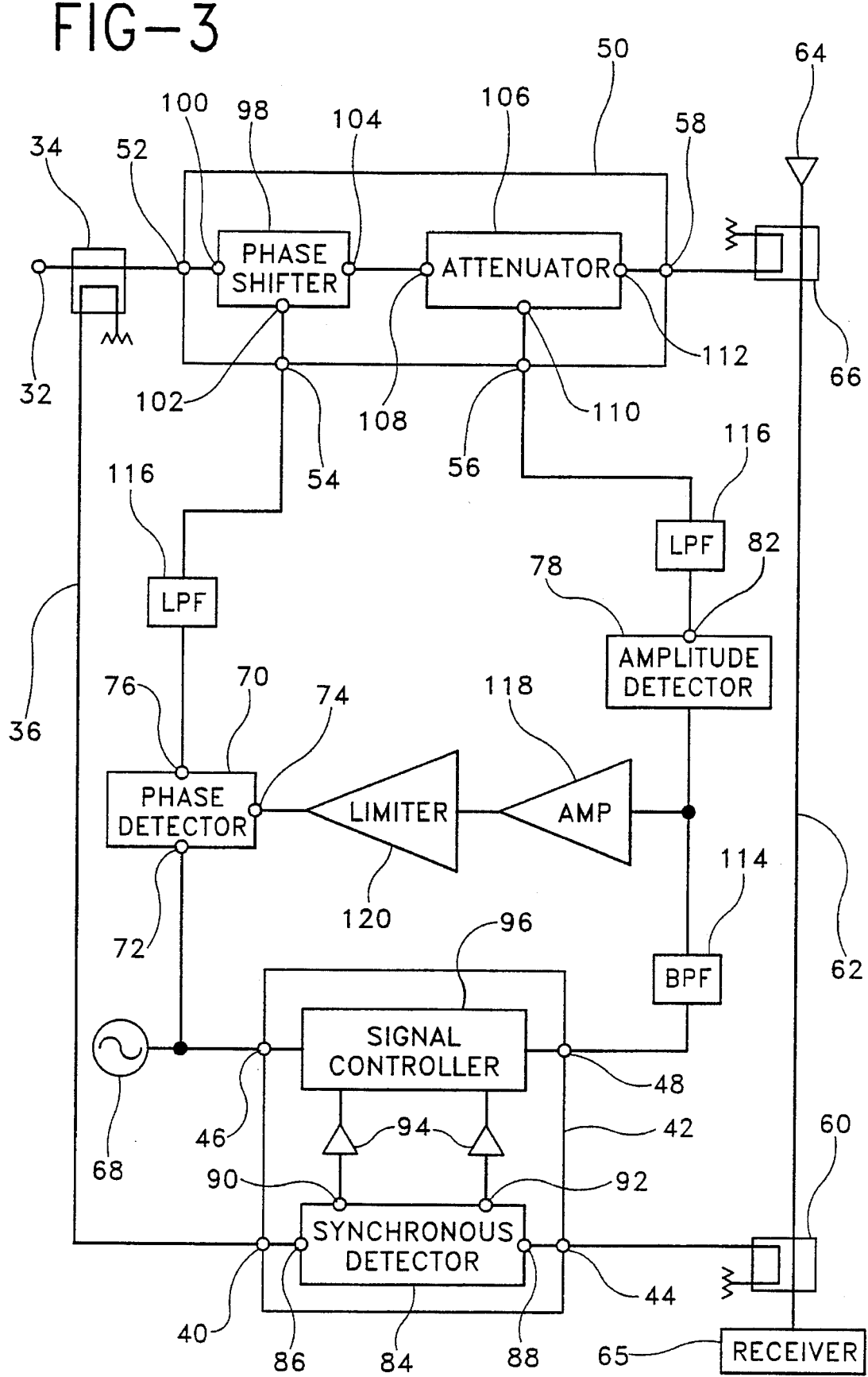
FIG. 3 is a functional block diagram of a second form of an interference canceler employing a polar vector modulator formed in accordance with the present invention.

Referring now to FIG. 3 and in an alternative form of the present invention, the interference cancellation system employing a polar vector modulator may further include a series of filters to refine the signals being generated. The cancellation system of the present invention may include a band-pass filter 114 operatively coupled between the output port of the signal correlator circuit 42 and the inputs of the phase and amplitude detectors 70,78. In addition, low-pass filters 116 may be coupled between the phase detector output port 76 and the polar vector modulator input port 54, and the amplitude detector output port 82 and the polar vector modulator input port 56. Additionally, the interference cancellation system of the present invention may include an amplifier 118 and limiter 120 coupled between the signal correlator circuit output port 48 and the phase detector second input port 74.

The operation of the above-described invention will now be described. Reference input port 32 receives a reference signal substantially representing the interfering signal which results in the interfering signal component of the received signal provided to receiver transmission line 62 by receiver antenna 64. Reference coupler 34 provides a sample of the reference signal via line 36 to first input port 86 of synchronous detector 84. Substantially concurrently, error coupler 60 provides a sample of the received signal to the synchronous detector second input port 88. In addition, the signal controller 96 receives an auxiliary signal having substantially a fixed frequency and amplitude, generated by signal generator 68. Thereafter, the synchronous detector will compare and correlate the reference signal sample to the received signal sample and generate control signals in response thereto. The control signals effectively represent phase and amplitude manipulations of the reference signal which would have to be invoked to effectively eliminate the interfering signal component from the received signal if the reference signal sample was injected onto the receiver transmission line.

As previously stated, the present invention includes a signal generator 68 which provides the auxiliary signal to the signal controller 96. The signal controller manipulates the auxiliary signal in accordance with the control signals provided by the synchronous detector 84. As a result, only the auxiliary signal provided by the signal generator 68 is subject to the losses within the signal controller 96 as described in the description of the prior art. If the losses caused by the signal controller 96 utilized in the present invention are relatively large, the signal strength of the auxiliary signal can be increased to compensate for the losses. The increased power of the auxiliary signal is independent of the reference signal sample and the received signal. The auxiliary signal provided by the auxiliary signal generator 68 and the signal controller output signal are monitored by the phase detector 70 which senses the difference in phase between the auxiliary signal provided to the signal controller 96 and the signal controller output signal. The phase detector 70 effectively provides a first polar vector modulator control signal on output port 76. Similarly, amplitude detector 78 monitors the signal controller output signal to determine the amplitude of the signal controller output signal to provide a second polar vector modulator control signal.

The first polar vector modulator control signal is provided to input port 102 of the variable phase shifter 98 while the second polar vector modulator control signal is provided to input port 110 of the variable attenuator 106. The reference signal sample provided to reference input port 32 is supplied to the first input port 52 of the polar vector modulator and, accordingly, to the variable phase shifter first input port 100. The phase shifter 98 alters the phase of the reference signal sample provided at input port 100 and generates a phase shifted reference signal sample on output port 104 which is provided to attenuator input port 108. The attenuator 106 also receives the second polar vector modulator control signal (amplitude control signal) at input port 110 which effectively instructs the attenuator as to how to alter the amplitude of the phase shifted reference signal sample. The attenuator provides an amplitude and phase shifted reference signal (cancellation signal) at polar vector modulator output port 58. This signal, which is preferably equal in magnitude but opposite in phase to the interfering signals component of the received signal, is hereafter injected by summing coupler 66 onto receiver transmission line 62, effectively canceling the interfering signal component from the received signal.

As is evident from the above description, since the interference cancellation system employing a polar vector modulator of the present invention only includes a variable phase shifter and attenuator coupled in series, each of which has only a 0.5 dB or less insertion loss, the losses in the reference signal path between the reference input port and the receiver transmission line of the interference cancellation system are minimal and far below the losses associated with conventional vector modulators of known interference cancellation systems. Due to the reduced insertion loss, enhanced cancellation performance is achieved and the interference cancellation system has greater sensitivity and lower noise and signal distortion than conventional systems.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. An interference cancellation system for reducing an interfering signal in a received signal on a transmission line to provide a desired signal on the transmission line, the interference cancellation system comprising:

a reference input port for receiving a reference signal substantially corresponding to the interfering signal;

a reference coupler having at least an input port and an output port, the at least an input port of the reference coupler being operatively coupled to the reference input port, at least a portion of the reference signal being provided to the input port of the reference coupler, the at least one reference coupler output port generating thereon a reference coupler output signal substantially corresponding to the at least a portion of the reference signal;

an error coupler having at least an input port and an output port, the input port of the error coupler being operatively coupled to the transmission line for receiving a sample of the received signal, the received signal substantially corresponding to a combination of the desired signal and the interfering signal, the error coupler output port generating thereon an error coupler output signal substantially corresponding to the received signal;

a signal correlator circuit having first, second and third input ports and an output port, the signal correlator circuit first input port being operatively coupled to the at least one reference coupler output port, the signal correlator second input port being operatively coupled to the at least one error coupler output port;

a signal generator having an output port being operatively coupled and providing an auxiliary signal to the signal correlator circuit third input port;

a phase detector having first and second input ports and an output port, the phase detector first input port being operatively coupled to the signal correlator circuit third input port, the phase detector second input port being coupled to the signal correlator circuit output port, the phase detector output port providing a phase detector output signal;

an amplitude detector having an input port and an output port, the amplitude detector input port being operatively coupled to the signal correlator circuit output port, the amplitude detector output port providing an amplitude detector output signal;

a polar vector modulator, the polar vector modulator having first, second and third input ports and an output port, the polar vector modulator first input port being operatively coupled to the reference input port, the polar vector modulator second input port being operatively coupled to the phase detector output port and receiving the phase detector output signal, the polar vector modulator third input port being operatively coupled to the amplitude detector output port and receiving the amplitude detector output signal, the polar vector modulator output port providing a cancellation signal; and a summing coupler having at least an input port and an output port, the at least one summing coupler input port being operatively coupled to the polar vector modulator output port, the summing coupler output port providing the cancellation signal to the transmission line.

2. An interference cancellation system as defined by claim 1, wherein the reference signal includes an amplitude component and a phase component, and wherein the polar vector modulator comprises:

a variable phase shifter having first and second input ports and an output port, the variable phase shifter first and second input ports respectively corresponding to and being operatively coupled to the polar vector modulator first and second input ports, the variable phase shifter receiving the phase detector output signal from the phase detector, the variable phase shifter manipulating the phase component of the reference signal and providing a phase shifter output signal; and a variable attenuator having first and second input ports and an output port, the variable attenuator first input port being operatively coupled to the variable phase shifter output port and receiving the variable phase shifter output signal, the variable attenuator second input port corresponding to and being operatively coupled to the polar vector modulator third input port, the variable attenuator second input port receiving the amplitude detector output signal from the amplitude detector, the variable attenuator output port corresponding to and being operatively coupled to the polar vector modulator output port, the variable attenuator manipulating the amplitude component of the reference signal, the variable attenuator providing an attenuator output signal corresponding to the cancellation signal.

3. An interference cancellation system as defined by claim 1, wherein the signal correlator circuit comprises:

a synchronous detector, the synchronous detector having first and second input ports and first and second output ports, the first and second input ports of the synchronous detector respectively corresponding to and being operatively coupled to the first and second input ports of the signal correlator circuit, the synchronous detector generating first and second output signals respectively provided on the synchronous detector first and second output ports; and a signal controller, the signal controller having first, second and third input ports and an output port, the first and second input ports of the signal controller being respectively operatively coupled to the first and second output ports of the synchronous detector and receiving the synchronous detector first and second output signals, the signal controller third input port corresponding to and being operatively coupled to the third input port of the signal correlator circuit, the output port of the signal controller corresponding to and being operatively coupled to the output port of the signal correlator circuit, the signal controller providing a signal controller output signal corresponding to the signal correlator circuit output signal which corresponds to the auxiliary signal adjusted in phase and amplitude.

4. An interference cancellation system as defined by claim 3, wherein the signal correlator circuit further comprises:

at least one of an integrator and an amplifier, the at least one of an integrator and an amplifier being respectively coupled between at least one of the first and second output ports of the synchronous detector and at least one of the first and second input ports of the signal controller, the at least one of an integrator and an amplifier receiving one of the first and second synchronous detector output signals and providing an output signal to the signal controller.

5. A method for removing an interfering signal component from a received signal, the method comprising:

sampling an interfering signal which results in the interfering signal component of the received signal, and providing a reference signal corresponding thereto;

sampling the received signal having the interfering signal component and providing an error signal corresponding thereto;

comparing and correlating the reference signal with the error signal and generating a first control signal in response thereto;

adjusting the amplitude and phase of an auxiliary signal in accordance with the first control signal to provide an adjusted auxiliary signal;

comparing the relative phase of the auxiliary signal with the phase of the adjusted auxiliary signal and generating a second control signal in response to the comparison thereof;

detecting the amplitude of the adjusted auxiliary signal and generating a third control signal in response thereto;

adjusting the phase of the reference signal in response to the second control signal and adjusting the amplitude of the reference signal in response to the third control signal, and thereby generating a cancellation signal corresponding to the reference signal adjusted in phase and amplitude, the cancellation signal being substantially equal in amplitude to and opposite in phase to the interfering signal component of the received signal; and summing the cancellation signal and the received signal so as to effectively cancel the interfering signal component from the received signal.

6. An interference cancellation system for cancelling an interfering signal component of a received signal carried by a transmission line, which comprises:

a reference coupler, the reference coupler receiving a reference signal corresponding to an interfering signal and providing first and second output signals in response thereto;

an error coupler, the error coupler being coupled to the transmission line and receiving the received signal having the interfering signal component carried thereby and providing an error signal in response thereto;

a signal generator, the signal generator generating an output signal of known frequency and amplitude;

a signal correlator circuit, the signal correlator circuit including a synchronous detector and a signal controller, the synchronous detector being responsive to the error signal and the first output signal of the reference coupler and generating at least one control signal in response thereto, the signal controller being responsive to the at least one control signal and the output signal of the signal generator and generating an output signal in response thereto;

a phase detector, the phase detector being responsive to the output signal of the signal generator and the output signal of the signal controller and generating a phase detector output signal in response thereto;

an amplitude detector, the amplitude detector being responsive to the output signal of the signal controller and generating an amplitude detector output signal in response thereto;

a polar vector modulator, the polar vector modulator being responsive to the phase detector output signal and the amplitude detector output signal and being further responsive to the second output signal of the reference coupler and generating a cancellation signal in response thereto, the cancellation signal corresponding to the second output signal adjusted in phase and amplitude by the polar vector modulator; and a summing coupler, the summing coupler being coupled to the transmission line and injecting the cancellation signal onto the transmission line for cancelling the interfering signal component of the received signal carried thereby.

7. An interference cancellation system as defined by claim 6, wherein the polar vector modulator includes a variable phase shifter and a variable attenuator coupled together in series, the variable phase shifter being responsive to the phase detector output signal and adjusting the phase of the second output signal of the reference coupler in response thereto, the variable attenuator being responsive to the amplitude detector output signal and adjusting the amplitude of the second output signal of the reference coupler in response thereto, thereby generating the cancellation signal.

* * * * *